US007414673B2

(12) United States Patent
Shyu

(10) Patent No.: US 7,414,673 B2
(45) Date of Patent: Aug. 19, 2008

(54) METHOD AND APPARATUS FOR CORRECTING NONLINEAR COLOR MIXING ERRORS

(75) Inventor: Ming-Ching Shyu, Taipei (TW)

(73) Assignee: Colorart Technology Inc., Taipei (TW)

( * ) Notice: Subject to any disclaimer, the term of this patent is extended or adjusted under 35 U.S.C. 154(b) by 584 days.

(21) Appl. No.: 11/052,059

(22) Filed: Feb. 8, 2005

(65) Prior Publication Data

US 2005/0286098 A1 Dec. 29, 2005

(30) Foreign Application Priority Data

Jun. 23, 2004 (TW) ............................ 93118141 A

(51) Int. Cl.
*H04N 9/64* (2006.01)

(52) U.S. Cl. ..................................................... 348/675

(58) Field of Classification Search ................. 348/675, 348/659–661, 694, 650, 651, 671, 672; 345/88, 345/87; 382/167–169
See application file for complete search history.

(56) References Cited

U.S. PATENT DOCUMENTS 4,488,245 A * 12/1984 Dalke et al. ................. 382/167
4,989,079 A * 1/1991 Ito ............................ 358/520
5,440,352 A * 8/1995 Deter et al. ................. 348/750
5,828,781 A * 10/1998 Nakano ...................... 382/167
6,320,668 B1 * 11/2001 Kim .......................... 358/1.1
6,435,654 B1 * 8/2002 Wang et al. .................... 347/43
6,492,968 B1 * 12/2002 Yuan et al. ..................... 345/88
6,683,982 B1 * 1/2004 Kohn ......................... 382/167
6,774,953 B2 * 8/2004 Champion et al. .......... 348/651

FOREIGN PATENT DOCUMENTS

JP 2001318651 A * 11/2001

* cited by examiner

*Primary Examiner*—Paulos M Natnael
(74) *Attorney, Agent, or Firm*—Bacon & Thomas, PLLC

(57) ABSTRACT

The present invention discloses a method and an apparatus for correcting color mixing errors, which lets a color display device adopt a virtual material quantity concept and use at least one set of predetermined virtual primary colors to analyze mixed color signal values displayed on the color display device and establish a corresponding material characteristic functions between color control signal values and corresponding virtual control signal values, and eventually establish nonlinear color correction functions between a series of known control signal values corresponding to desired color signal values of the color display device, in such a way that when the color display device performs a video color conversion, the control signal values actually entered into the color display device are corrected to the corresponding target control signal values for allowing the color display device to display desired color signal values.

11 Claims, 4 Drawing Sheets

METHOD AND APPARATUS FOR CORRECTING NONLINEAR COLOR MIXING ERRORS

BACKGROUND OF THE INVENTION

1. Field of the Invention

The present invention relates to a method and an apparatus for correcting color mixing errors in a color display device, and more particularly to a method and an apparatus for correcting nonlinear color mixing errors in a color display device.

2. Description of the Related Art

At present, a color display device such as a cathode ray tube (CRT) displays video data based on a color mixing theory with the three primary colors: red (hereinafter referred to as R), green (hereinafter referred to as G) and blue (hereinafter referred to as B) of the color display device, and then these three are mixed with different intensities to produce various colors on the device. Taking the color CRT incorporated in the present computer system as an example, one can observe that the video signals are displayed on the color CRT on an 8-bit-per-channel scale: pure red color (R, G, B)=(255, 0, 0), pure green color (R, G, B)=(0, 255, 0), pure blue color (R. C, B)=(0, 0, 255), and white color (R, G, B)=(255, 255, 255). If the tri-stimulus values (X, Y and Z defined by the International Commission on Illumination, CIE) are used to represent the values of the measured colors, then ($X_r$, $Y_r$ and $Z_r$) stands for red color; ($X_g$, $Y_g$ and $Z_g$) stands for green color; and ($X_b$, $Y_b$ and $Z_b$) stands for blue color. Therefore the mixed color ($X_c$, $Y_c$ and $Z_c$) of a (R, G, B) signal displayed on the color CRT can be represented by the tri-stimulus values of the CIE as given in Equation (1) below:

$$\begin{bmatrix} X_c \\ Y_c \\ Z_c \end{bmatrix} = \begin{bmatrix} X_r & X_g & X_b \\ Y_r & Y_g & Y_b \\ Z_r & Z_g & Z_b \end{bmatrix} \cdot \begin{bmatrix} R \\ G \\ B \end{bmatrix} \tag{1}$$

Then, if the defined range (such as 8 bits) of the signals for the three color R, C, and B lights are normalized as $N_r$=R/255, $N_g$=G/255 and $N_b$=B/255, and when the normalized values then are $N_r$=1, $N_g$=1 and $N_b$=1 respectively, pure red color ($X_{rmax}$, $Y_{rmax}$, $Z_{rmax}$), pure green color ($X_{gmax}$, $Y_{gmax}$, $Z_{gmax}$) and pure blue color ($X_{bmax}$, $Y_{bmax}$, $Z_{bmax}$) are obtained respectively.

Theoretically, the white color light is produced when $N_r$=$N_g$=$N_b$=1 at the same time, and its mixed color ($X_w$, $Y_w$, $Z_w$) can be represented in Equations (2) and (3) as follows:

$$\begin{bmatrix} X_w \\ Y_w \\ Z_w \end{bmatrix} = \begin{bmatrix} X_{r\max} & X_{g\max} & X_{b\max} \\ Y_{r\max} & Y_{g\max} & Y_{b\max} \\ Z_{r\max} & Z_{g\max} & Z_{b\max} \end{bmatrix} \cdot \begin{bmatrix} N_r \\ N_g \\ N_b \end{bmatrix} \tag{2}$$

$$= \begin{bmatrix} Xr\max + Xg\max + Xb\max \\ Yr\max + Yg\max + Yb\max \\ Zr\max + Zg\max + Zb\max \end{bmatrix} \tag{3}$$

When various values of the $N_r$, $N_g$ and $N_b$ are given, different color signal values (X, Y, Z) are produced according to the color mixing model described in Equation (2). The color mixing method used to generate mixed colors is generally called a "Linear Additive Three-Color Mixing Model".

Although most of the common cathode ray tubes adopt the aforementioned linear additive three-color mixing model, it is found that the color mixing model and the processing used in various color liquid crystal displays (LCD) today are different from that of the linear additive three-color mixing model. One of the common non-linear characteristics of LCD screens resides in the existence of a nonlinear relation between the three color control signals R, G, B and the color signals X, Y, Z. Such nonlinear relation can be represented by the nonlinear gamma characteristic as shown in FIG. (1), where the x-axis represents the control signal of the liquid crystal display and the y-axis represents the color signal. Furthermore, the liquid crystal display actually possesses additive failure characteristic, which is mainly caused by the nonlinear crosstalk characteristic of the color display device itself in such a way that there is interference produced by signal mixing, and this interference will generate interaction or crosstalk within the mixed signals X, Y and Z. For example, when a pure red color (R, G, B)=(255, 0, 0), a pure green color (R, G, B)=(0, 255, 0) and a pure blue color (R, G, B)=(0, 0, 255) are displayed separately, the sum of the values of X, Y and Z signals of the measured colors are not equal to the values of the measured X, Y and Z signals of the color when the color liquid crystal displays the control signal of a pure white color (R, G, B)=(255, 255, 255). As shown in FIG. 2, the x-axis is the control signal and the y-axis is the measured CIE Y values, whereas Y(white) represents the measured CIE Y values for pure white color ramp (by simultaneously inputting equal amounts of R, G, and B ranged from 0 to 255 into the color liquid crystal device); and Y(R)+Y(G)+Y(B) represents the sum of the individually measured CIE Y values for pure red, pure green and pure blue color ramps throughout the range. It is noteworthy that the additive failure characteristic is one of the major issues of the present color liquid crystal displays, since this characteristic causes the color mixing of the color liquid crystal display to no longer follow the linear additive color mixing model.

To overcome the nonlinear problem created by the "gamma characteristic" of a traditional color liquid crystal display, an inventor, Mr. Tae-Sung Kim of the Korean Samsung Electronics Co. Ltd., disclosed a "gamma correction circuit" in the U.S. Pat. No. 5,796,384, and such gamma correction circuit records and corrects the nonlinear relation between the three color light control signals (R, G, B) and the color display signal (X, Y, Z) of the color liquid crystal display by way of a memory device. The objective of Kim's invention is to adjust the relation between the light transmissivity and the input value of a control signal to a substantially linear manner. Even though after the gamma correction, it is possible to mathematically add the three foregoing independent linearized color lights (such as R, G and B) to produce a specific color, the actual color liquid crystal display may still have an "additive failure" phenomenon caused by the crosstalk effect such that the chromaticity of the mixed white color ramp would shift at different levels of the digital control signals. The other phenomenon is known as an "unstable primary" by which the chromaticity of the pure color ramps would shift as shown in FIG. 3. It was described in related literature such as YASHIDA 2002 (Yasuhiro Yashida and Yoichi Yamamoto, Color Calibration of LCDs, IS&T and SID The $10^{th}$ Color Imaging Conference Proceedings, pp. 305-311, 2002.). Therefore, the invention of the U.S. Pat. No. 5,796,384 issued to Mr. Tae-Sung Kim simply mapped the control signal to a correction signal and intended to create a linear display between the control signal (R, G, B) and the mixed color display signal (X, Y, Z). However, Kim's invention is unable to fully solve the aforementioned problems of the color liquid crystal display.

In view of the shortcomings of the "additive failure" and the "unstable primary" problems occurred in the video color display of the prior-art liquid crystal display, the way of designing a color display so that the desired color can be displayed in a video display at a low manufacturing cost and a simple processing model becomes an important subject to the present color display designers and manufacturers.

SUMMARY OF THE INVENTION

The primary objective of the present invention is to provide a method for correcting nonlinear color mixing errors. The method is based on a matrix color mixing model, yet it further adopts a concept of virtual material characteristics, which uses at least one set of predetermined virtual primary colors for analyzing the displayed color signal values with the corresponding virtual control signal values. Based on the virtual control signal values, material characteristic functions are established between a series of known control signal values (like R, G, B) corresponding to the color signal values (like CIE X, Y and Z) of the color display device and the virtual control signal values in such a way that when the color display device performs a video color conversion, the control signal values actually entered into the color display are corrected to the corresponding target control signal value and the color display device displays the desired color signal values on the color display device.

Another objective of the present invention is to select a series of known control signal values (R, G, B) in advance, and then to enter these values into a color display device. The corresponding color signal values (X, Y, Z), such as the CIE X, Y, and Z values displayed on the color display device, are measured one by one. At least one set of virtual primary colors ($X_\alpha$, $Y_\alpha$, $Z_\alpha$), ($X_\beta$, $Y_\beta$, $Z_\beta$) and ($X_\gamma$, $Y_\gamma$, $Z_\gamma$) and their corresponding virtual control signal values ($\alpha$, $\beta$, $\gamma$) are calculated for the color signal values (X, Y, Z). A relation of the corresponding material characteristic functions can be established according to the known control signal values (R, G, B) and the virtual control signal values ($\alpha$, $\beta$, $\gamma$). Therefore, if the color display device needs to mix another series of desired color signal values ($X_m$, $Y_m$, $Z_m$), then the corresponding virtual control signal values ($\alpha_m$, $\beta_m$, $\gamma_m$) can be found first by using the matrix color mixing model, and the virtual control signal values ($\alpha_m$, $\beta_m$, $\gamma_m$) are brought into the inverse functions of the material characteristic functions. By the inverse functions, the target control signal values ($r_m$, $g_m$, $b_m$) required as the input values for the color display device to produce the desired color signal values ($X_m$, $Y_m$, $Z_m$) can be found. Therefore, nonlinear color mixing correction functions can be derived from the relation between the control signal values (R, B, G) and the target control signal values ($r_m$, $g_m$, $b_m$), and such functions can be used to correct the actual control signal values (R, G, B) entered into the color display device to the corresponding proper control signal values ($r_m$, $g_m$, $b_m$) when the color display device performs a video color conversion as a basis for the color display device to display the desired color signal values ($X_m$, $Y_m$, $Z_m$).

Another objective of the present invention is to provide a device for correcting nonlinear color mixing errors. The device comprises a characteristic analyzing module within which a material characteristic processor can calculate at least one set of virtual primary colors ($X_\alpha$, $Y_\alpha$, $Z_\alpha$), ($X_\beta$, $Y_\beta$, $Z_\beta$) and ($X_\gamma$, $Y_\gamma$, $Z_\gamma$) according to a series of the color signal values (X, Y, Z) produced by the color display device. Each set of the virtual primary colors is saved into a primary color recording unit and sent to a material quantity analyzing processor which calculates the corresponding virtual control signal values ($\alpha$, $\beta$, $\gamma$). Then the material characteristic process creates a relation of the material characteristic functions between the corresponding virtual control signal values ($\alpha$, $\beta$, $\gamma$) and the known control signal values (R, G, B) and saves the material characteristic functions into a corresponding material characteristic function recording unit.

A further objective of the present invention is to include a target synthesis module in the device for correcting nonlinear color mixing errors. This module uses a system correction function processor to read another series of target color values ($X_m$, $Y_m$, $Z_m$) and selects the virtual primary colors ($X_\alpha$, $Y_\alpha$, $Z_\alpha$), ($X_\beta$, $Y_\beta$, $Z_\beta$) and ($X_\gamma$, $Y_\gamma$, $Z_\gamma$) from the primary color recording unit. This information is sent to the material quantity analyzing processor which calculates the corresponding virtual control signal values ($\alpha_m$, $\beta_m$, $\gamma_m$) in such a way that after the system correction function processor has read the material characteristic functions saved earlier in the corresponding material characteristic function recording unit, the virtual control signal values ($\alpha_m$, $\beta_m$, $\gamma_m$) can be put into the material characteristic function. By the inverse function, the corresponding target control values ($r_m$, $g_m$, $b_m$) are found, and the corresponding relation between the corresponding target control values ($r_m$, $g_m$, $b_m$) and the actual control signal values (R, G, B) is established as nonlinear color mixing correction functions and recorded into a system correction function recording unit.

Another objective of the present invention is to include a correction application module in the device for correcting nonlinear color mixing errors. This module includes a color correction processor for reading the nonlinear color mixing correction functions to convert the control signal values (R, G, B) entered into the color display device to proper ($r_m$, $g_m$, $b_m$) values, consequently performs a video color conversion and produces the desired color signal values ($X_m$, $Y_m$, $Z_m$).

To make it easier to understand the objective of the invention, its structure, innovative features and performance, we use a preferred embodiment and the attached drawings for the detailed description of the invention.

DETAILED DESCRIPTION OF THE PREFERRED EMBODIMENTS

Figure 1:
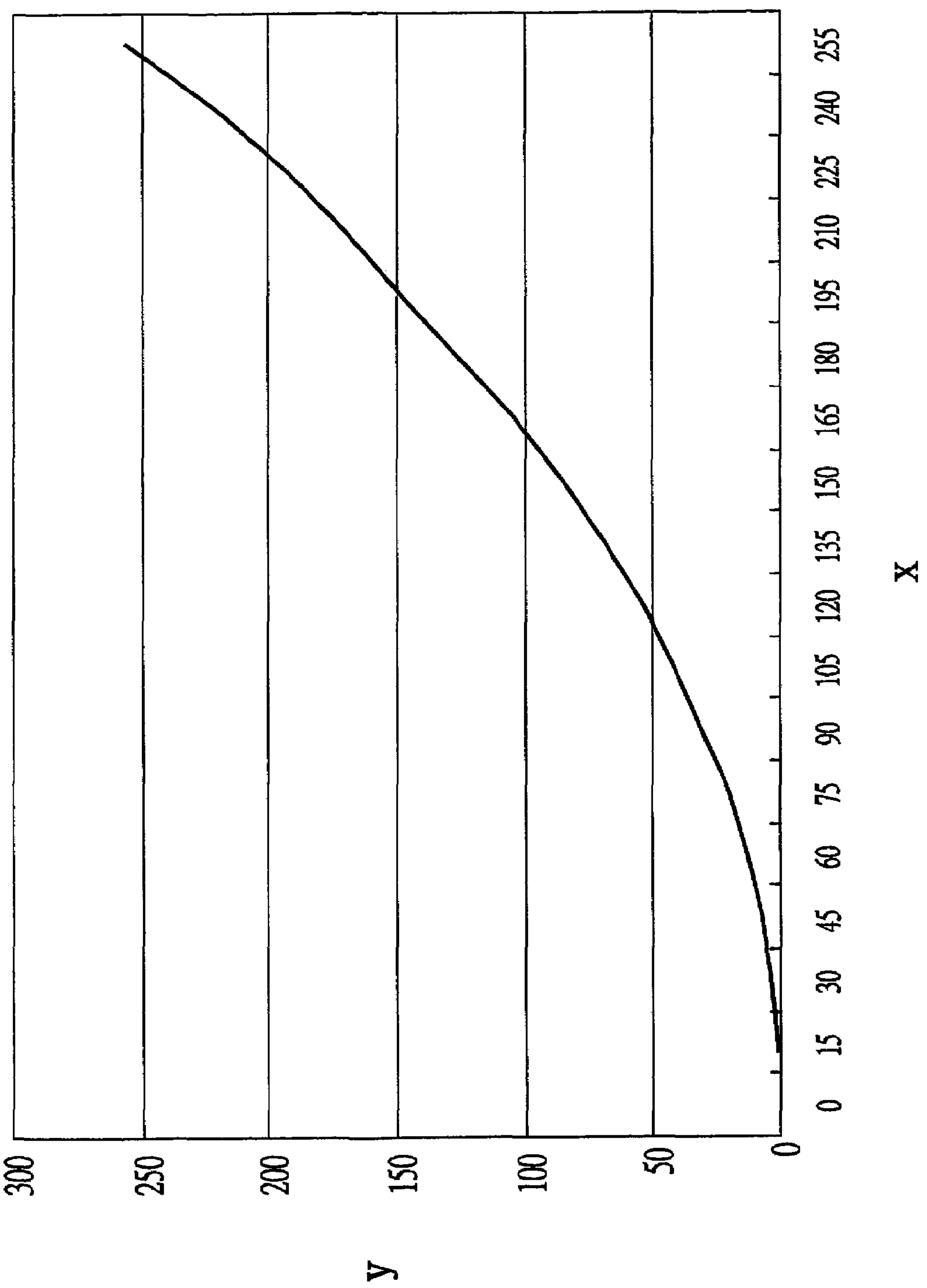
FIG. 1 is a graph illustrating the nonlinear gamma characteristic of a common color liquid crystal display, wherein the x-axis represents the value (R, G, B) of the digital control signal and the y-axis represents the value of luminance (cd/$m^2$).
Figure 2:
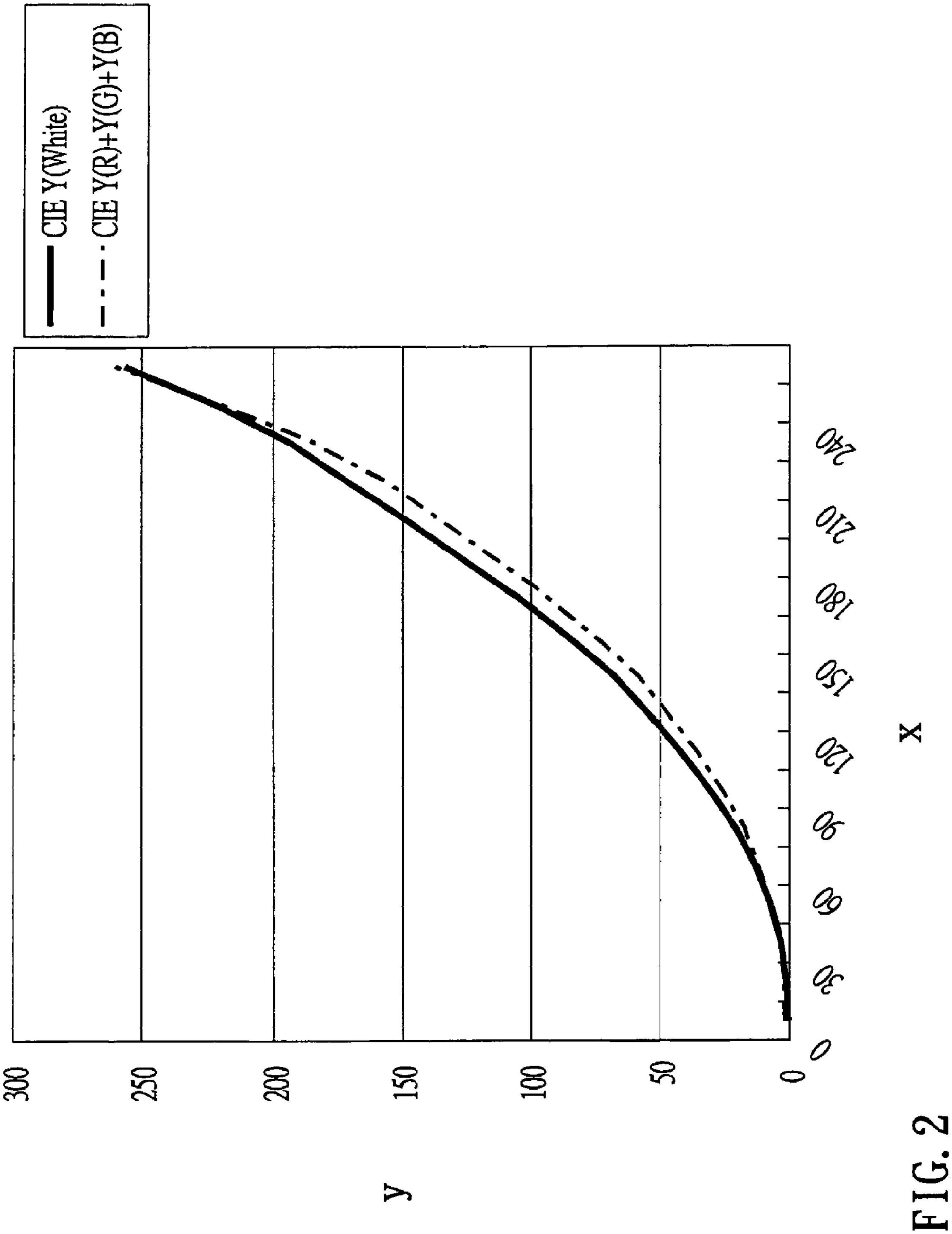
FIG. 2 is a graph illustrating the additive failure characteristic of a common color liquid crystal display as well as the difference between the sum of the gray scale values (Y(R)+Y(G)+Y(B)) of individually showing the R, G and B colors and the gray scale value (Y(white)) of simultaneously showing R, G and B colors, wherein the x-axis represents the value (R, G, B) of the digital control signal and the y-axis represents the CIE XYZ value.
Figure 3:
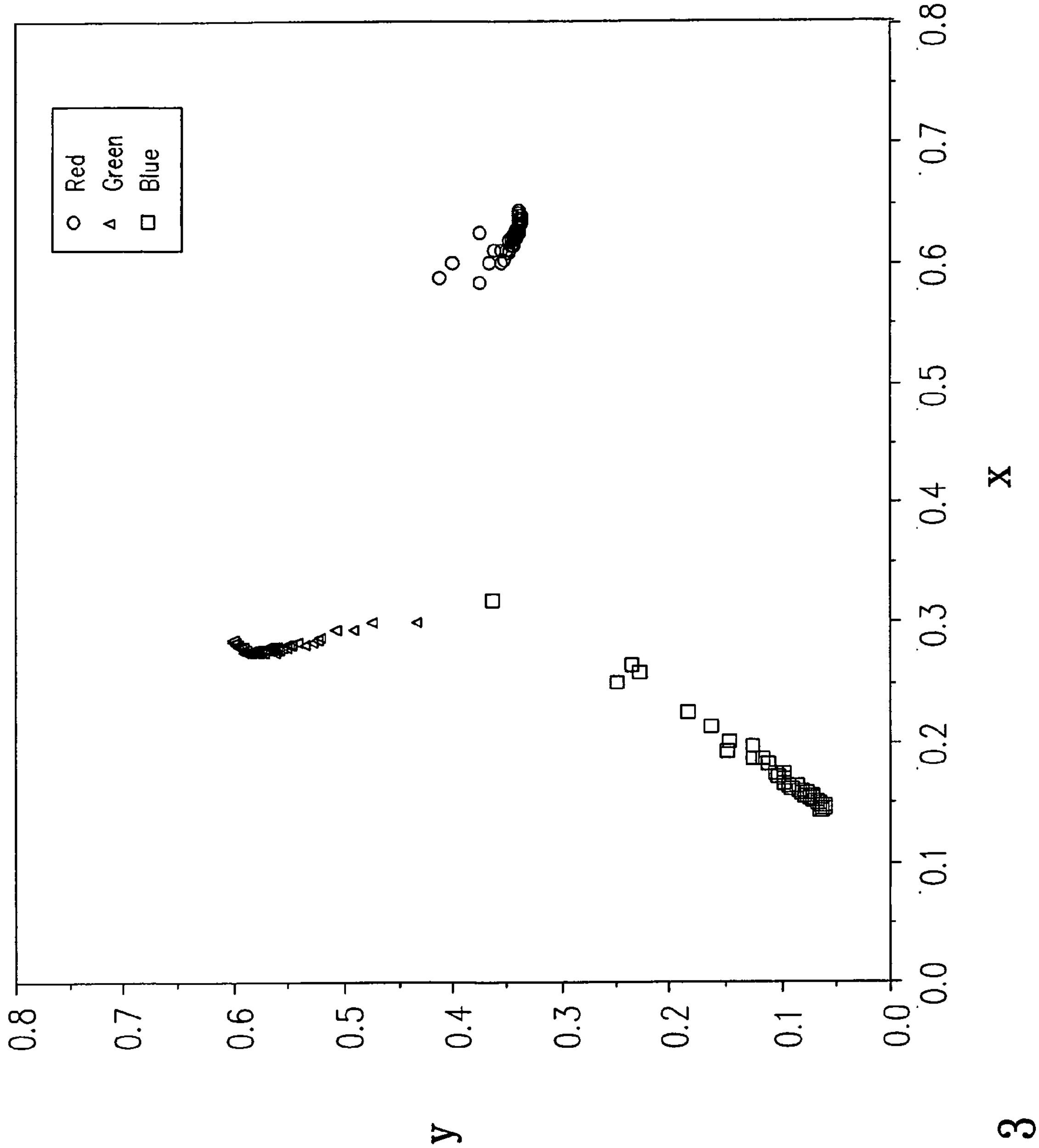
FIG. 3 is a graph illustrating the unstable condition of the primary colors of a common color liquid crystal display, wherein the positions of the three primary colors: pure red color, pure green color and pure blue color in the chromaticity coordinates will shift according to the digital control signal (where the x-axis represents the x-coordinate of the CIE chromaticity coordinates and the y-axis is the y-coordinate of the CIE chromaticity coordinates).

The present invention discloses a method for correcting nonlinear color mixing errors. This method is based on a matrix color mixing model, yet it further adopts the concept of virtual material characteristics which uses at least one set of predetermined virtual primary colors for analyzing the displayed color signal values with the corresponding virtual control signal values. Based on the virtual control signal values, material characteristic functions are established between a series of known control signal values (like R, G, B) corresponding to the color signal values (like CIE X, Y and Z) of the color display device and the target virtual control signal values. Nonlinear color mixing correction functions are consequently created by using the inverse functions of the material characteristic functions in such a way that when the color display device performs a video color conversion, the control signal values actually entered into the color display are corrected to the corresponding target control signal value and the color display device will display the desired color signal values on the color display device.

The concept of the design of the present invention is to select a series of known control signal values (R, G, B) for a color display device first, and then to enter each control signal value into a color display device. The corresponding color signal values (X, Y, Z), such as the CIE X, Y, and Z values displayed on the color display device are measured one by one. In this invention, these values are called training data. Taking a color display device having an 8-bit signal value for example, the R, G and B of the known control signal values fall in the range of 0~255. However, the present invention is not limited by such range. By anyone skilled in the art the technical measures disclosed in the present invention can be applied to a color display device having a signal value with a different number of bits. It is understood that such modification is also covered by the scope of applications of this invention.

Further, at least one set of virtual primary colors ($X_\alpha$, $Y_\alpha$, $Z_\alpha$), ($X_\beta$, $Y_\beta$, $Z_\beta$) and ($X_\gamma$, $Y_\gamma$, $Z_\gamma$) is calculated according to the color signal values (X, Y, Z). The virtual control signal values (α, β, γ) corresponding to the virtual primary colors are found by the following mathematical equations.

$$\begin{bmatrix} X \\ Y \\ Z \end{bmatrix} = \begin{bmatrix} X_\alpha & X_\beta & X_\gamma \\ Y_\alpha & Y_\beta & Y_\gamma \\ Z_\alpha & Z_\beta & Z_\gamma \end{bmatrix} \cdot \begin{bmatrix} \alpha \\ \beta \\ \gamma \end{bmatrix}$$

$$\begin{bmatrix} \alpha \\ \beta \\ \gamma \end{bmatrix} = \begin{bmatrix} X_\alpha & X_\beta & X_\gamma \\ Y_\alpha & Y_\beta & Y_\gamma \\ Z_\alpha & Z_\beta & Z_\gamma \end{bmatrix}^{-1} \cdot \begin{bmatrix} X \\ Y \\ Z \end{bmatrix}$$

In the color mixing process of the present invention, if the virtual control signal values (α, β, γ) become stable and color mixing property including additive failure can be observed between the virtual control signal values (α, β, γ) and the known control signal values (R, G, B), then the following relation of nonlinear functions will occur between the virtual control signal values (α, β, γ) and the known control signal values (R, G, B):

$$\alpha = f(R)$$

$$\beta = g(G)$$

$$\gamma = h(B)$$

where f(R), g(R) and h(R) are nonlinear functions. Therefore, a corresponding relation of the material characteristic functions is established from the known control signal values (R, G, B) to the virtual control signal values (α, β, γ). If a color display device needs to mix another series of desired color values ($X_m$, $Y_m$, $Z_m$), the corresponding virtual control signal values ($\alpha_m$, $\beta_m$, $\gamma_m$) can be found by using the virtual primary colors as follows:

$$\begin{bmatrix} \alpha_m \\ \beta_m \\ \gamma_m \end{bmatrix} = \begin{bmatrix} X_\alpha & X_\beta & X_\gamma \\ Y_\alpha & Y_\beta & Y_\gamma \\ Z_\alpha & Z_\beta & Z_\gamma \end{bmatrix}^{-1} \cdot \begin{bmatrix} X_m \\ Y_m \\ Z_m \end{bmatrix}$$

Then the virtual control signal values ($\alpha_m$, $\beta_m$, $\gamma_m$) are brought into the the material characteristic functions between the known control signal values (R, G, B) and the foregoing virtual control signal values (α, β, γ). By the inverse functions, the target control signal values ($r_m$, $g_m$, $b_m$) required for the input when the color display device produces the desired color signal values ($X_m$, $Y_m$, $Z_m$) can be found as follows:

$$r_m = f^{1}(\alpha_m)$$

$$g_m = g^{-1}(\beta_m)$$

$$b_m = h^{-1}(\gamma_m)$$

Therefore, nonlinear color mixing correction functions can be established between the control signal values (R, B, G) and the target control signal values ($r_m$, $g_m$, $b_m$) for the color display device to display the desired color signal values ($X_m$, $Y_m$, $Z_m$). The present invention uses such functions to correct the actual control signal values (R, G, B) entered into the color display device to the corresponding target control signal values ($r_m$, $g_m$, $b_m$) when the color display device performs a video color conversion, so that the color display device will display the desired color signal values ($X_m$, $Y_m$, $Z_m$).

Figure 4:
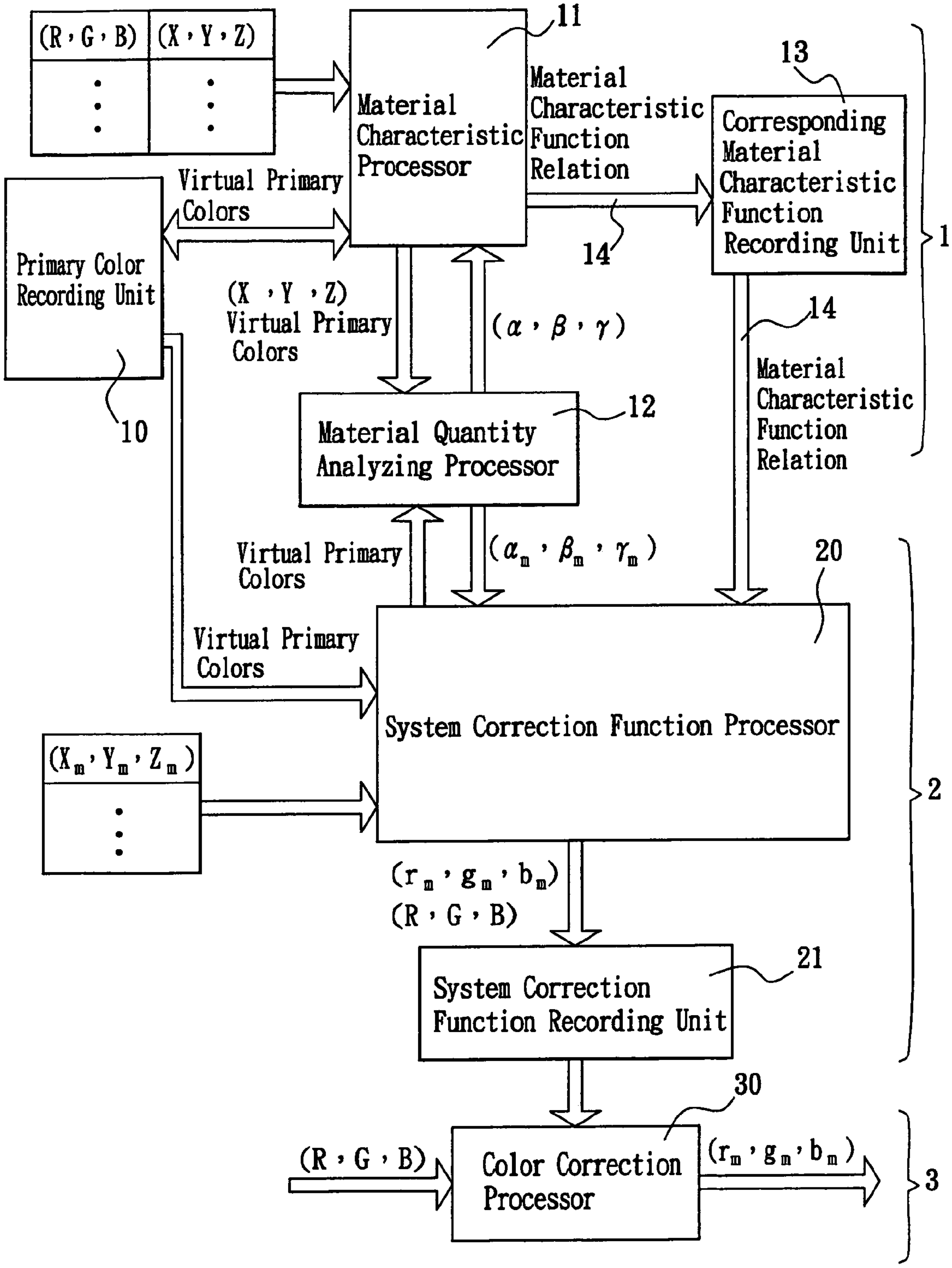
FIG. 4 is a block diagram illustrating the architecture of a nonlinear color mixing error correction device and system according to the present invention.

Refer to FIG. 4 for a device for correcting nonlinear color mixing errors according to the present invention. Such device comprises a characteristic analyzing module 1 and a material characteristic processor 11 which calculates at least one set of virtual primary colors ($X_\alpha$, $Y_\alpha$, $Z_\alpha$) ($X_\beta$, $Y_\beta$, $Z_\beta$) and ($X_\gamma$, $Y_\gamma$, $Z_\gamma$) according to a series of the color signal values (X, Y, Z) produced by the color display device. Each set of the virtual primary colors is saved into a primary color recording unit 10 and sent to a material quantity analyzing processor 12. This material quantity analyzing processor 12 calculates the corresponding virtual control signals (α, β, γ) according to the values of the training data and virtual primary colors and creates the relation of the corresponding material characteristic functions 14 between the known control signal values (R, G, B) and the corresponding virtual control signals (α, β, γ) and finally saves the material characteristic functions 14 into a corresponding material characteristic function recording unit 13.

The device for correcting nonlinear color mixing errors according to the present invention further comprises a target synthesis module 2. This target synthesis model 2 includes a system correction function processor 20 to read another series of target color values ($X_m$, $Y_m$, $Z_m$) and selects the virtual primary colors ($X_\alpha$, $Y_\alpha$, $Z_\alpha$), ($X_\beta$, $Y_\beta$, $Z_\beta$) and ($X_\gamma$, $Y_\gamma$, $Z_\gamma$)

from the primary color recording unit 10. This information is sent to the material quantity analyzing processor 12. The material quantity analyzing processor 12 calculates the corresponding virtual control signal values ($\alpha_m$, $\alpha_m$, $\alpha_m$) according to the target color signal values and the virtual primary colors, and the corresponding virtual control signal values ($\alpha_m$, $\alpha_m$, $\alpha_m$) are sent back to the system correction function processor 20, so that the system correction function processor 20 reads the material characteristic functions 14 saved in the corresponding material characteristic functions recording unit 13, and the virtual control signal values ($\alpha_m$, $\beta_m$, $\gamma_m$) can be brought into the material characteristic function 14. By the inverse functions, the corresponding target control values ($r_m$, $g_m$, $b_m$) are found, and the corresponding relation between the target control values ($r_m$, $g_m$, $b_m$) and the actual control signal values (R, G, B) is established and recorded into a system correction function recording unit 21. Thus the present invention uses nonlinear color mixing correction functions between the actual control signal values (R, B, G) and the target control signal values ($r_m$, $g_m$, $b_m$) to correct the control signal values (R, G, B) entered into the color display device to the corresponding target control signal values ($r_m$, $g_m$, $b_m$) when the color display device performs a video color conversion so that the color display device will produce the desired color signal values ($X_m$, $Y_m$, $Z_m$).

In the practical applications of the present invention the color display device also has the primary colors shifting phenomenon, and therefore several different sets of values for the virtual primary colors are saved in the primary color recording unit 10. The material characteristic processor 11 and the system correction function processor 20 will decide how to use at least one set of the virtual primary colors according to the desired color signal values ($X_m$, $Y_m$, $Z_m$).

In a preferred embodiment of the present invention, a popular color LCD is taken as an example for the description below. It is noteworthy, however, that the application of this invention is not limited to color LCD. By anyone skilled in the art the technical measures disclosed in the present invention can be applied to other color display devices. If a nonlinear relation exists between the control signal values (R, Q B) and the color signal values (X, Y, Z) of the color display device and an "additive failure" and "unstable primary" occur while the video colors are displayed, then all of these are intended to be covered by the claims of this invention. In this preferred embodiment, if 256 sets (from 0 to 255) of known control signal values (R, G, B) are entered into a color LCD, the mixed color signal values (X, Y, Z) and each set of the control signal values (R, G, B) show an S-shaped nonlinear relation. In the meantime the color temperature of the mixed color will show a shifting phenomenon.

Therefore 256 sets of the control signal values (R, G, B) have been selected to be entered into the color LCD according to this embodiment. After 256 sets of the corresponding mixed color signal values (X, Y, Z) have been measured, at least one set of virtual primary colors ($X_\alpha$, $Y_\alpha$, $Z_\alpha$), ($X_\beta$, $Y_\beta$, $Z_\beta$) and ($X_\gamma$, $Y_\gamma$, $Z_\gamma$) is used to perform a three-color mixing analysis for the mixed color signal value (X, Y, Z) to find the 256 sets of the virtual control signal values ($\alpha$, $\beta$, $\gamma$) and also to establish the corresponding material characteristic functions from the control signal values (R, G, B) of the color LCD to the virtual control signal values ($\alpha$, $\beta$, $\gamma$) for the relation between the values of $\alpha$ and R, $\beta$ and G, and $\gamma$ and B. Therefore, if the color LCD displays 256 sets of target mixed color signal values ($X_m$, $Y_m$, $Z_m$), the same set of virtual primary colors ($X_\alpha$, $Y_\alpha$, $Z_\alpha$), ($X_\beta$, $Y_\beta$, $Z_\beta$) and ($X_\gamma$, $Y_\gamma$, $Z_\gamma$) can be used to find a series of corresponding virtual control signal values ($\alpha_m$, $\beta_m$, $\gamma_m$). Then the series of target virtual control signals ($\alpha_m$, $\beta_m$, $\gamma_m$) is brought into the material characteristic functions. By the inverse functions, the corresponding target control signal values ($r_m$, $g_m$, $b_m$) can be derived and thus a corresponding relation between the target control signal values ($r_m$, $g_m$, $b_m$) and the actual control signal values (R, G, B) entered into the color LCD is established and recorded. The nonlinear color correction function will be derived from the relation between the target control signal values ($r_m$, $g_m$, $b_m$) and the actual control signal values (R, G, B) and will be used to correct the actual control signal values (R, G, B) entered into the color LCD to the corresponding target control signal value ($r_m$, $g_m$, $b_m$) as a basis for the color LCD to display the desired signal values ($X_m$, $Y_m$, $Z_m$).

In summation of the above description, the present invention herein enhances the performance of the conventional structure. It further complies with the patent application requirements and is submitted to the Patent and Trademark Office for review and granting of the commensurate patent rights.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements.

What the invention claimed is:

1. A method for correcting nonlinear color mixing errors, and said method letting a color display device incorporate a virtual material quantity concept and use at least one set of predetermined virtual primary colors to analyze mixed color signals displayed on said color display device and establish corresponding material characteristic functions between color control signal values of the mixed color signals and corresponding virtual control signal values of the virtual primary colors, and consequently establish nonlinear correction functions between a series of known control signal values corresponding to target virtual color signal values of said color display device, so that when said color display device performs a video color conversion, said control signal values actually entered into said color display device are corrected to corresponding target control signal values for allowing said color display device to display desired color signal values, wherein said color display device calculates said corresponding virtual control signal values by said virtual primary colors when mixing another series of target color signal values, and said virtual control signal values are brought into said material characteristic functions, so that target control signal values required for an input when said color display device displays said desired color signal values are calculated by means of inverse functions.

2. The method for correcting nonlinear color mixing errors of claim 1, wherein said material characteristic functions are derived by way of the following operations: selecting a series of known control signal values (R, G, B) and entering said series of known control signal values (R, G, B) into said color display device and measuring corresponding color signal values (X, Y, Z) displayed by said color display device one by one, and calculating at least one set of virtual primary colors ($X_\alpha$, $Y_\alpha$, $Z_\alpha$), ($X_\beta$, $Y_\beta$, $Z_\beta$) and ($X_\gamma$, $Y_\gamma$, $Z_\gamma$) according to said corresponding color signal values (X, Y, Z), and creating said material characteristic functions from said known control signal values (R, G, B) to said virtual control signal values ($\alpha$, $\beta$, $\gamma$) according to said calculated virtual control signal values ($\alpha$, $\beta$, $\gamma$) with said virtual primary colors.

3. The method for correcting nonlinear color mixing errors of claim 2, wherein said color display device calculates said corresponding virtual control signal values ($\alpha_m$, $\beta_m$, $\gamma_m$) by said virtual primary colors first when said color display device mixes another series of target color signal values ($X_m$, $Y_m$, $Z_m$), and said virtual control signal values ($\alpha_m$, $\beta_m$, $\gamma_m$) are brought into inverse functions of said material characteristic functions as to calculate target control signal values ($r_m$, $g_m$, $b_m$) required for an input when said color display device generates said target mixed color signal values ($X_m$, $Y_m$, $Z_m$).

4. The method for correcting nonlinear color mixing errors of claim 3, wherein said control signal values (R, G, B) and said target control signal values ($r_m$, $g_m$, $b_m$) have such a nonlinear color mixing relation that when said color display device performs a video color conversion, said control signal values (R, G, B) actually entered into said color display device are corrected to said corresponding control signal values ($r_m$, $g_m$, $b_m$) as a basis for said color display device to display desired color signal values ($X_m$, $Y_m$, $Z_m$).

5. The method for correcting nonlinear color mixing errors of claim 4, wherein said control signal values (R, G, B) and said color signal values (X, Y, Z) of said color display device show a nonlinear relation.

6. The method for correcting nonlinear color mixing errors of claim 5, wherein said color display device is a color liquid crystal display (LCD).

7. An apparatus for correcting nonlinear color mixing errors, comprising:

a characteristic analyzing module, including a material characteristic processor for calculating at least one set of virtual primary colors ($X_\alpha$, $Y_\alpha$, $Z_\alpha$), ($X_\beta$, $Y_\beta$, $Z_\beta$) and ($X_\gamma$, $Y_\gamma$, $Z_\gamma$) according to a series of color signal values (X, Y, Z) produced by a color display device, and each set of said virtual primary colors being saved into a primary color recording unit and sent to a material quantity analyzing processor, and said material quantity analyzing processor calculating corresponding virtual control signal values ($\alpha$, $\beta$, $\gamma$) and creating a relation of corresponding material characteristic functions between said virtual control signal values ($\alpha$, $\beta$, $\gamma$) and known control signal values (R, G, B) and saving said material characteristic functions in a corresponding material characteristic function recording unit;

a target synthesis module, comprising a system correction function processor for reading another series of target color signal values ($X_m$, $Y_m$, $Z_m$) and selecting said virtual primary colors ($X_\alpha$, $Y_\alpha$, $Z_\alpha$), ($X_\beta$, $Y_\beta$, $Z_\beta$) and ($X_\gamma$, $Y_\gamma$, $Z_\gamma$) from said primary color recording unit, and said information being sent to said material quantity analyzing processor, and said material quantity analyzing processor calculating a series of said virtual control signal values ($\alpha_m$, $\beta_m$, $\gamma_m$) so that after said system correction function processor reads the previously saved said material characteristic functions in said corresponding material characteristic function recording unit, said virtual control signal values ($\alpha_m$, $\beta_m$, $\gamma_m$) are brought into the inverse functions of said material characteristic functions, and corresponding target control values ($r_m$, $g_m$, $b_m$) are calculated, and said corresponding relation between said target control values ($r_m$, $g_m$, $b_m$) and said actual control signal values (R, G, B) is established and recorded into a system correction function recording unit;

thereby said control signal values (R, G, B) and said target control signal values ($r_m$, $g_m$, $b_m$) have such nonlinear color mixing correction functions that when said color display device performs a video color conversion, said control signal values (R, G, B) actually entered into said color display device are corrected to said corresponding control signal values ($r_m$, $g_m$, $b_m$) as a basis for said color display device to display desired color signal values ($X_m$, $Y_m$, $Z_m$).

8. The apparatus for correcting nonlinear color mixing errors of claim 7 further comprising a correction application module that utilizes a color correction processor to read in said nonlinear color mixing correction functions between said actual control signal values (R, G, B) and said target control signal values ($r_m$, $g_m$, $b_m$) so as to correct said control signal values (R, G, B) entered into said color display device when said color display device performs a video color conversion and produces desired color signal values ($X_m$, $Y_m$, $Z_m$).

9. The apparatus for correcting nonlinear color mixing errors of claim 8, wherein said primary color recording unit stores a plurality of different sets of virtual primary color values in such a way that said material characteristic processor and said system correction function processor decide to use at least one set of virtual primary color values according to desired color mixing signal values ($X_m$, $Y_m$, $Z_m$).

10. The apparatus for correcting nonlinear color mixing errors of claim 9, wherein said control signal values (R, G, B) and said color signal values (X, Y, Z) of said color display device show a nonlinear relation.

11. The apparatus for correcting nonlinear color mixing errors of claim 10, wherein said color display device is a color liquid crystal display (LCD).

* * * * *